United States Patent
Bauer et al.

(10) Patent No.: US 9,058,187 B2
(45) Date of Patent: Jun. 16, 2015

(54) DISPLAYING CURRENT TASK LISTS ON GRAPHICAL USER INTERFACES OF PROCESSING MACHINE CONTROL

(75) Inventors: Klaus Bauer, Ditzingen (DE); Sabine Kerres, Hemmingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 529 days.

(21) Appl. No.: 13/246,292

(22) Filed: Sep. 27, 2011

(65) Prior Publication Data

US 2012/0030603 A1  Feb. 2, 2012

Related U.S. Application Data

(63) Continuation of application No. PCT/DE2010/000242, filed on Mar. 5, 2010.

(30) Foreign Application Priority Data

Apr. 2, 2009  (DE) .......................... 10 2009 002 136

(51) Int. Cl.
| | |
|---|---|
| *G06F 3/0481* | (2013.01) |
| *G06F 9/44* | (2006.01) |
| *G06F 11/36* | (2006.01) |
| *G06F 3/0484* | (2013.01) |

(52) U.S. Cl.
CPC ............ *G06F 9/4443* (2013.01); *G06F 3/0481* (2013.01); *G06F 11/3664* (2013.01); *G06F 3/04817* (2013.01); *G06F 3/04847* (2013.01)

(58) Field of Classification Search
CPC ...................................... G06F 3/0481–3/04897
USPC .................. 715/771–773, 736, 740, 741, 779
See application file for complete search history.

(56) References Cited

U.S. PATENT DOCUMENTS

| | | | |
|---|---|---|---|
| 4,843,538 | A | 6/1989 | Lane et al. |
| 5,179,655 | A | 1/1993 | Noguchi et al. |
| 5,265,202 | A | 11/1993 | Krueger et al. |
| 5,283,560 | A | 2/1994 | Bartlett |

(Continued)

FOREIGN PATENT DOCUMENTS

JP          09006457 A    10/1997

OTHER PUBLICATIONS

Notification of Transmittal of Translation of the International Preliminary Report on Patentability for corresponding PCT Application No. PCT/DE2010/000242, mailed Nov. 10, 2011, 9 pages.

(Continued)

*Primary Examiner* — Kieu Vu
*Assistant Examiner* — Shangao Zhang
(74) *Attorney, Agent, or Firm* — Fish & Richardson P.C.

(57) ABSTRACT

Methods, computer program products and devices for displaying a current task list on a graphical user interface of a control computer of a processing machine. In implementations, a running task list is provided, each task of the running task list including a task that is running on the control computer, a release task list is defined, each task of the release task list being selectively provided in the release task list based on predetermined, dynamically monitored selection criteria, the current task list is defined, each task of the current task list being provided in the running task list and in the release task list, and the current task list is displayed on the graphical user interface.

20 Claims, 4 Drawing Sheets

(56) References Cited

U.S. PATENT DOCUMENTS

| | | | |
|---|---|---|---|
| 5,390,295 | A | 2/1995 | Bates et al. |
| 5,590,265 | A | 12/1996 | Nakazawa |
| 5,617,114 | A | 4/1997 | Bier et al. |
| 5,742,285 | A | 4/1998 | Ueda |
| 5,764,229 | A | 6/1998 | Bennett |
| 6,831,666 | B1 * | 12/2004 | Kreis .................. 715/781 |
| 2002/0143949 | A1 * | 10/2002 | Rajarajan et al. ......... 709/226 |
| 2003/0191817 | A1 * | 10/2003 | Fidler .................. 709/219 |
| 2006/0224963 | A1 | 10/2006 | Katsuranis et al. |
| 2007/0143713 | A1 * | 6/2007 | Hosoki et al. .......... 715/859 |
| 2008/0088433 | A1 * | 4/2008 | Baker et al. ............ 340/531 |

OTHER PUBLICATIONS

Siemens AG, SINUMERIK 840C Software Version 5—OEM Version for Windows—Operator's Guide—04.96 Edition, Order No. 6FC5198-5AA60, 1996, 38 pages.

eXtended Task Manager, Extended Windows Task Manager and Performance Monitoring Tool, for optimizing Developer Environments, Warecase, Jul. 28, 2006, 4 pages.

International Search Report for corresponding PCT Application No. PCT/DE2010/000242, mailed Aug. 5, 2010, 4 pages.

* cited by examiner

DISPLAYING CURRENT TASK LISTS ON GRAPHICAL USER INTERFACES OF PROCESSING MACHINE CONTROL

CROSS REFERENCE TO RELATED APPLICATIONS

This application is a continuation of and claims priority under 35 U.S.C. §120 to PCT Application No. PCT/DE2010/000242 filed on Mar. 5, 2010, which claimed priority to German Application No. DE 10 2009 002 136.1, filed on Apr. 2, 2009. The contents of both of these priority applications are hereby incorporated by reference in their entirety.

TECHNICAL FIELD

The invention relates to a method, a device and a computer program product for displaying a current task list on the graphical user interface of a control computer of a processing machine, only those tasks which are running on the control computer and which are set out in a release list of the control computer being displayed when the task list is called up.

BACKGROUND

Current task lists of software running on a control computer of a processing machine can be displayed on a graphical user interface. In some operating systems, task switchers are provided. Using these task switchers, the user is able to have displayed a list of the opened windows on the graphical user interface using, for example, the combination of the Alt+Tab keys and to select a task in order to bring the task into the foreground of the graphical user interface and to activate it.

By changing operating system settings or using software tools, it is possible to statically, that is to say, permanently until the system settings are adjusted again, select which tasks are included in a release list which indicates which tasks can be displayed in a task list on the graphical user interface and which cannot.

In the case of a control computer of a processing machine, this static adjustment has the disadvantages that in the current operating situation tasks which are not required also appear in the task list and can lead to a lack of clarity and that tasks which, in the event of an operating error, can lead to the erroneous abortion of a program which is running, and consequently the processing machine, may be called up by a task switcher.

SUMMARY

In general, the present invention is directed to methods, computer program products and devices for displaying a current task list on a graphical user interface of a control computer of a processing machine. In implementations methods include actions of providing a running task list, each task of the running task list including a task that is running on the control computer, defining a release task list, each task of the release task list being selectively provided in the release task list based on predetermined, dynamically monitored selection criteria, defining the current task list, each task of the current task list being provided in the running task list and in the release task list, and displaying the current task list on the graphical user interface.

In some aspects, a task of the current task list is activated based on user input to the current task list.

In some aspects, actions further include displaying a task of the current task list in a foreground of the graphical user interface in response to user input.

In some aspects, the selection criteria comprise at least one of a user login, a status of the processing machine, a date/time, dependencies of tasks in relation to each other, software settings, and software error messages.

In some aspects, software settings comprise at least one of country settings and language settings.

In some aspects, actions further include assigning one of an individual icon and an individual designation to tasks that are to be displayed on the graphical user interface.

In some aspects, displaying the current task list occurs automatically in response to specific selection criteria.

In some aspects, a device is provided and includes a display for displaying a graphical user interface, and a control computer, the control computer being operable to execute computer program code to perform actions discussed herein.

In some aspects, the device further includes a monitoring device that dynamically monitors the selection criteria.

In some aspects, the device further includes a release device that controls task release.

In some aspects, the display is provided as a touch screen display.

In some aspects, display of the current task is activated by an individual switching element. In some aspects, the individual switching element includes a hardware button on the input unit or a button on the display.

Implementations of the present invention provide one or more of the following advantages: the current task list becomes clearer since tasks which are not relevant to the machine operation at that time are not displayed, the dynamically monitored selection criteria may change, for example, in accordance with the processing sequence of the processing machine, machine error messages and settings, etc., a more rapid selection of the tasks which are to be activated or which are to be brought into the foreground of the graphical user interface can be provided, dependency on the user login as a selection criteria enables, for example, differentiation between the standard operator for whom only the machine operating application and the programming system normally have to be displayed in the task list and for whom the task change relating to these applications must be permitted, the setup operator for whom access to setup applications must further be granted, the service technician who requires additional access to service applications and selected operating system functionalities, the developer who requires additional access to specific development applications, and the administrator who requires access to all tasks for his activities.

Furthermore, it can be advantageous when specific tasks among tasks which are dependent on each other can be displayed or activated. In some examples, the operating software of the processing machine starts when various communication drivers have already been previously started correctly so that, after the start of the operating software, it can be assumed that no further input, and therefore no change to the communication drivers, is necessary. It may also be advantageous to monitor country and language settings. In this manner, it is possible to release from a plurality of equivalent applications, for example, only those with suitable languages or units (metric/inches, kilograms/pounds). Furthermore, the status of the processing machine or error messages of the tasks of the control computer may be a relevant selection criterion. By assigning an individual icon or an individual designation to the tasks that are to be displayed, the recognition and the selection of a task can also be highly simplified.

Other advantages of the invention will be appreciated from the description and the drawings. The features mentioned above and those set out below may also be used individually or together in any combination. The implementations shown and described should not be understood to be a conclusive listing but instead are of exemplary character for describing the invention. In the drawings:

DETAILED DESCRIPTION

Figure 1:
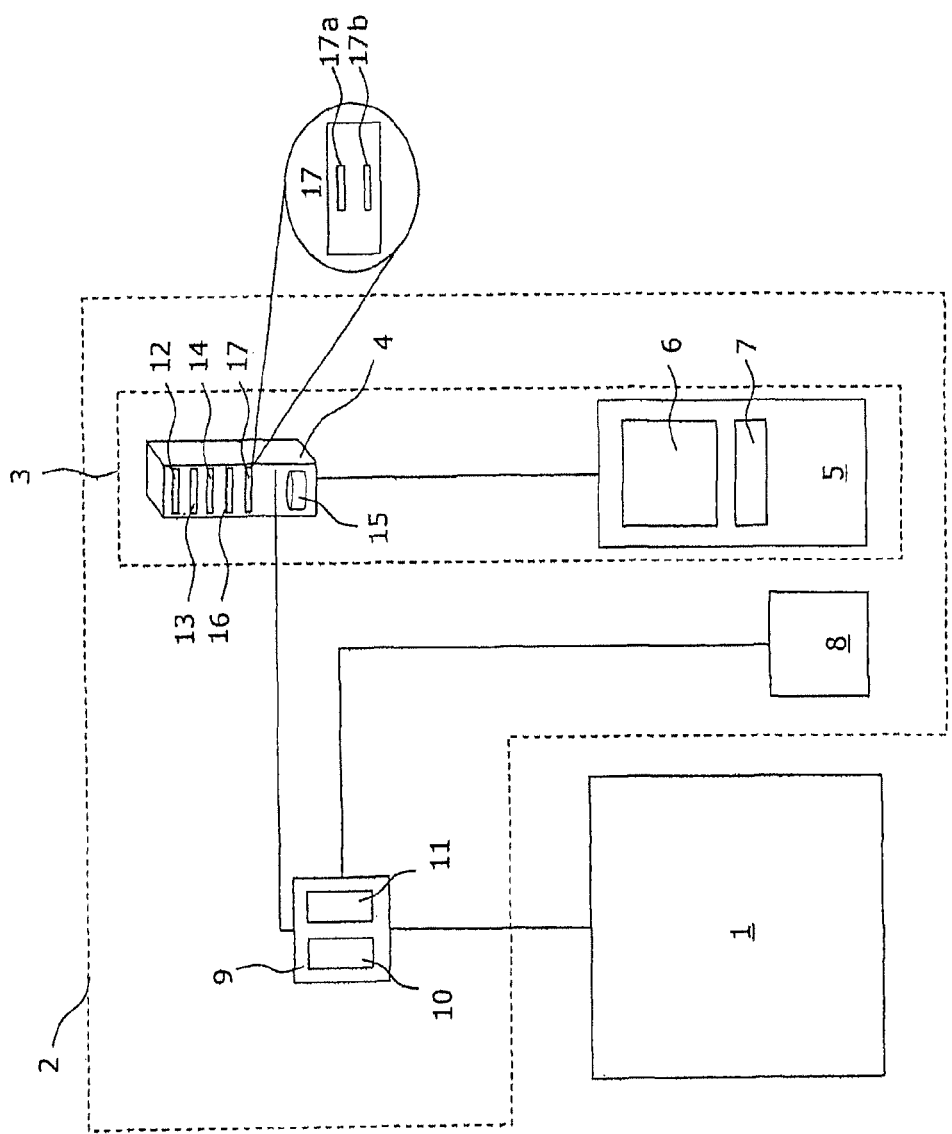
FIG. 1 is an overview of the processing machine, in which a device according to the invention is integrated, in order to carry out the method according to the invention in order to display a current task list on the graphical user interface of a control computer.

FIG. 1 shows a processing machine 1 which is controlled by means of a numerical control device 2. The numerical control device 2 includes, in terms of hardware, a Human Machine Interface (HMI) operating system 3 having a control computer 4 in the form of an industrial PC, and an operating device 5 having a screen 6 as a display unit which displays the graphical user interface, and having an input unit 7 which is, for example, in the form of a keyboard, mouse or touch panel. The control device 2 further includes a machine control panel 8 for manually operating the processing machine 1, with safety-relevant operations being carried out in particular, and a Numerical Control Unit (NCU) 9 with an integrated NC control unit 10 and PLC control unit 11 (Programmable Logic Control). The NC and PLC control units 10, 11 can also be constructed as separate units.

The control device 2 includes, in terms of software, operating software 12 for controlling the processing machine 1, software modules 13 for administering tasks, administering tools and administering pallets, program administration 14 for administering control programs and a data store 15, in which processing parameters for the control programs are stored as standard. The term "control program" includes, in addition to the NC program, technology data that is exported from the NC program to external data stores. It is further possible to install other applications such as, for example, a construction system, a programming system or a combined construction and programming system 16, on the control computer 4.

To produce a current task list T5 by means of dynamically monitored selection criteria Kn on the control computer 4 of a processing machine 1, a computer program product 17 can be used on the control computer 4 of the processing machine 1. The processing machine 1 contains a monitoring device 17a for monitoring the selection criteria Kn and a release device 17b for producing a dynamic release list T4.

Figure 2:
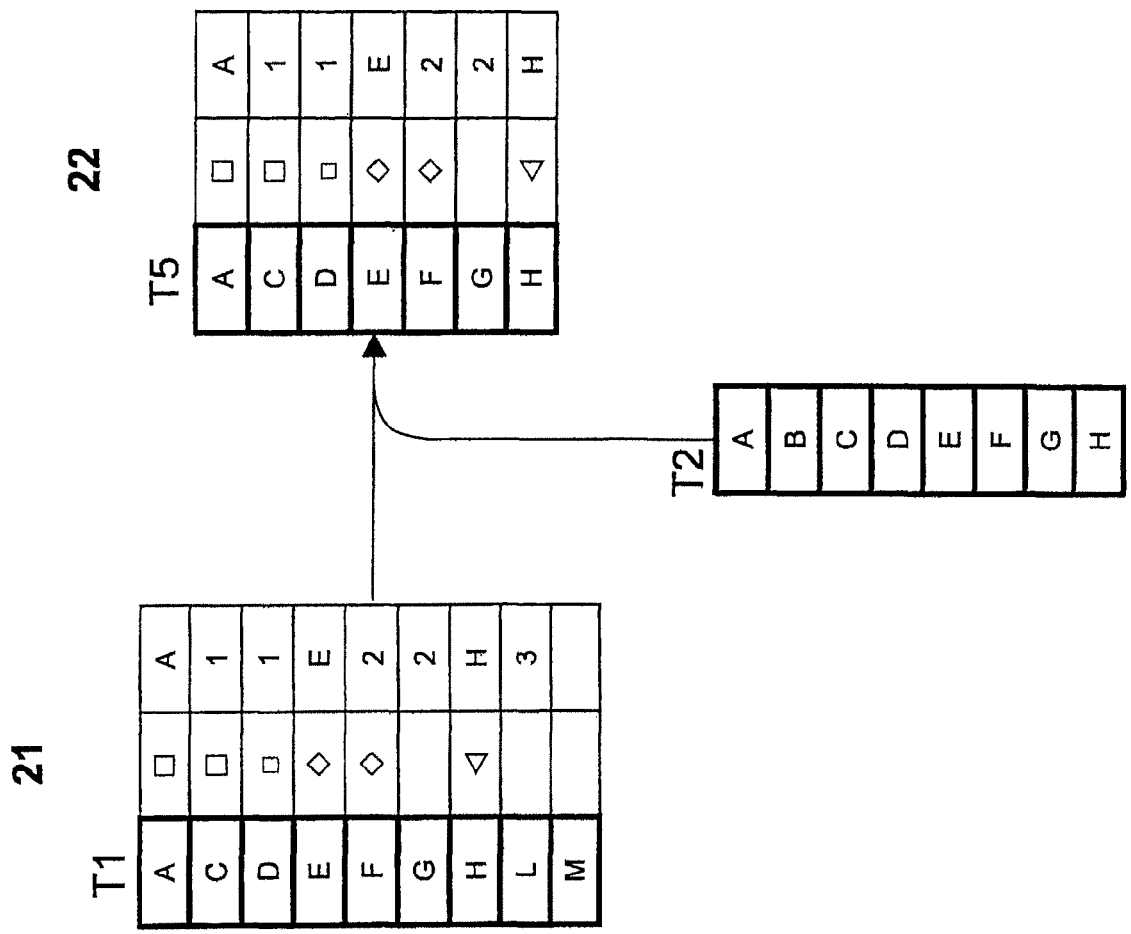
FIG. 2 shows a static release list for producing a current task list using traditional means.

FIG. 2 shows a traditional implementation for producing a current task list T5 (column 1 in Table 22) from a static release list T2. In the first column, Table 21 shows a list T1 of the tasks A, C-H, L, M currently running on a control computer. The symbols (icons) illustrated in columns 2 and 3 and names of the operating system are assigned to the individual tasks. It is also possible for no symbols or names or identical or similar symbols or names to be assigned to the tasks. Among the tasks from T1, only the ones which are stored in the static release list T2, that is to say, only the tasks A, C-H, are displayed in the task list T5 to be output (column 1 of Table 22). For the display on the graphical user interface 6 of the control computer of a processing system, the symbols (icons) and names which are assigned by the operating system and which are illustrated in Table 22, columns 2 and 3 are used.

Figure 3:
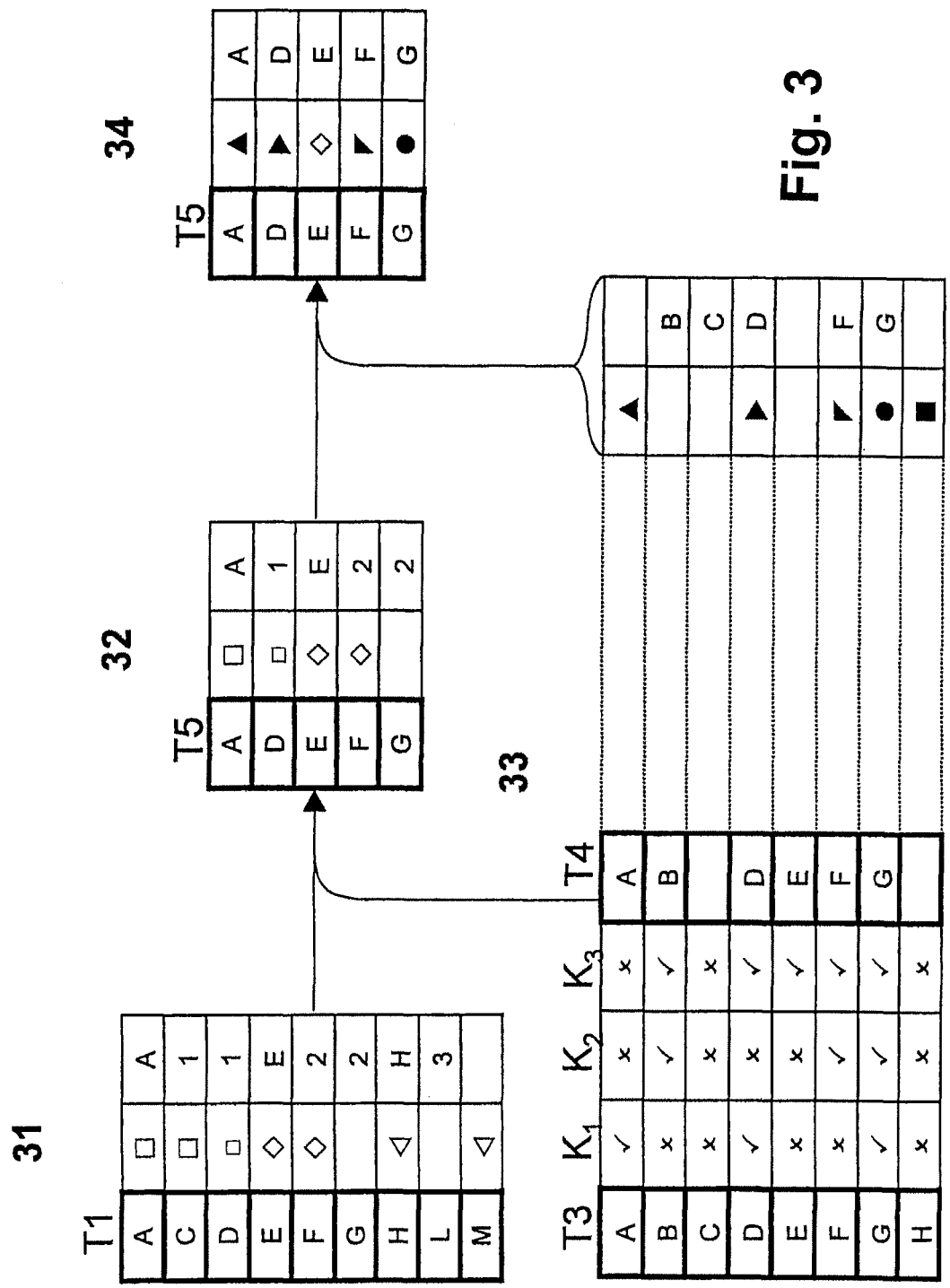
FIG. 3 shows a dynamic release list according to the invention, in which only those tasks which are released by monitoring predetermined selection criteria are set out.

In contrast, FIG. 3 shows an implementation of a method according to the invention for producing a current task list T5 by means of dynamically monitored selection criteria Kn on the control computer 4 of the processing machine 1. For this purpose, any number of selection criteria Kn which can provide the logical results TRUE and FALSE are assigned to each task A-H from a static list T3 of tasks which can be displayed (column 1 in Table 33). In FIG. 3, three criteria K1 to K3 are assigned to each task. The selection criteria which decide whether the task is included in the dynamic release list T4 (column 5 in Table 33) can be different for each task and can be connected by any logical operators, so-called boolean operators. In the illustration, the release list T4 results from an OR connection of the illustrated TRUE (✓) and FALSE (x) values of the three selection criteria, respectively. Only the tasks which have been released in the dynamic release list T4 are included in the current task list T5 (column 1 of Tables 32 and 34) from the tasks T1 running on the control computer 4 (column 1 in Table 31).

In an advantageous construction, the control computer 4 does not draw the symbols (icons) and names of the current task list T5 to be displayed on the graphical user interface 6 from columns 2 and 3 of Table 32, in which the symbols (icons) and names which are predefined by the operating system and which may be easy to confuse or incomprehensible are assigned to the current tasks. Instead, the symbols (icons) and names illustrated in the last two columns of Table 33 replace the symbols and names assigned by the operating system and are assigned to the current task list T5 in Table 34. The current task list which is displayed on the graphical user interface 6 draws its symbols and designations from the resultant Table 34 in that case.

Figure 4:
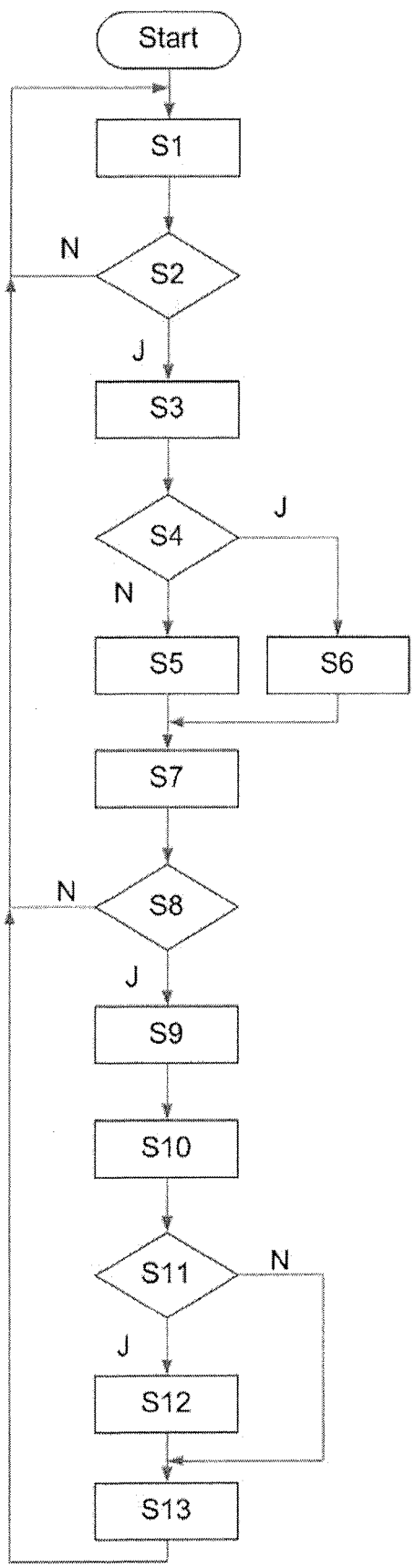
FIG. 4 is a flow chart of a task switcher method according to the invention.

FIG. 4 shows an implementation of a method according to the invention for activating tasks and an advantageous method for changing tasks on the graphical user interface 6 of the control computer 4 of the processing machine 1. After the start of the method, the activation devices with which the operator starts an interrogation of the task list in step S1. In step S2, if the result of the examination of step 1 is considered to be negative (N), the method begins from the beginning at step S1. If the result is positive (J), a list of all the tasks running on the control computer 4 is created in step S3. Optional step S4 decides, for example, by an additional user input or a preset, whether the dynamic release list T4 is intended to be used. If the result of the examination of step S4 is positive (J), the release list T4 released by dynamically monitored selection criteria Kn is created in step S6. If the result of the examination of step S4 is negative (N), the static release list T2 is created in step S5. In step S7, the current task list to be displayed on the graphical user interface 6 is created by forming the intersection of tasks currently being carried out on the processing system and the tasks of the release list last determined in step S5 or S6. In step S8, an examination is carried out as to whether the current task list contains at least one task. If the result of that examination is negative (N), the method begins again at step S1. If the result of the examination in step S8 is positive, the symbols (icons) and names of the tasks to be displayed are determined in step S9. In step S10, the symbols (icons) and names of the current task list T5 are displayed on the graphical user interface 6 of the control computer 4, for example, in an individual window. In step S11, the operator can select a task from the current task list T5, for example, by using a touch screen. Should the operator input in step S11 not occur within a predetermined time (N), step S13 follows directly. Should an operator input occur in good time (J), the selected task is activated in step S12 and/or brought into the foreground. In subsequent step S13, the window of the current task list is closed and the method returns to step S1.

A number of implementations of the invention have been described. Nevertheless, it will be understood that various modifications may be made without departing from the spirit and scope of the invention. Accordingly, other implementations are within the scope of the following claims.

What is claimed is:

1. A method for displaying a current task list on a graphical user interface of a control computer of a processing machine, the method comprising:
    providing a running task list, each task of the running task list comprising a task that is running on the control computer;
    determining, by one or more processors, respective values of predetermined, dynamically monitored selection criteria, the respective values changing based on one or more of processing machine error messages, and processing machine settings;
    defining, by the one or more processors, a release task list, each task of the release task list being selectively provided in the release task list based on the respective values of the selection criteria;
    defining, by the one or more processors, the current task list, each task of the current task list being provided in the running task list and in the release task list; and
    displaying the current task list on the graphical user interface.

2. The method according to claim 1, wherein a task of the current task list is activated based on user input to the current task list.

3. The method of claim 1, further comprising displaying a task of the current task list in a foreground of the graphical user interface in response to user input.

4. The method according to claim 1, wherein the selection criteria further comprise at least one of a user login, a date/time, dependencies of tasks in relation to each other, software settings, and software error messages.

5. The method of claim 4, wherein software settings comprise at least one of country settings and language settings.

6. The method according to claim 1, further comprising assigning one of an individual icon and an individual designation to tasks that are to be displayed on the graphical user interface.

7. The method of claim 1, wherein displaying the current task list occurs automatically in response to specific selection criteria.

8. A computer program product tangibly embodied in a non-transitory computer-readable storage medium coupled to one or more processors having stored instructions that, when executed, cause the one or more processors to perform operations comprising:
    providing a running task list, each task of the running task list comprising a task that is running on the control computer;
    determining respective values of predetermined, dynamically monitored selection criteria, the respective values changing based on one or more of processing machine error messages and processing machine settings;
    defining a release task list, each task of the release task list being selectively provided in the release task list based on the respective values of the selection criteria;
    defining a current task list, each task of the current task list being provided in the running task list and in the release task list; and
    displaying the current task list on the graphical user interface.

9. The computer program product according to claim 8, wherein a task of the current task list is activated based on user input to the current task list.

10. The computer program product of claim 8, wherein operations further comprise displaying a task of the current task list in a foreground of the graphical user interface in response to user input.

11. The computer program product according to claim 8, wherein the selection criteria further comprise at least one of a user login, a date/time, dependencies of tasks in relation to each other, software settings, and software error messages.

12. The computer program product of claim 11, wherein software settings comprise at least one of country settings and language settings.

13. The computer program product according to claim 8, wherein operations further comprise assigning one of an individual icon and an individual designation to tasks that are to be displayed on the graphical user interface.

14. The computer program product of claim 8, wherein displaying the current task list occurs automatically in response to specific selection criteria.

15. A device, comprising:
    a display for displaying a graphic user interface; and
    a control computer, the control computer being operable to execute computer program code to perform operations comprising:
        providing a running task list, each task of the running task list comprising a task that is running on the control computer;
        determining respective values of predetermined, dynamically monitored selection criteria, the respective values changing based on one or more of processing machine error messages, and processing machine settings;
        defining a release task list, each task of the release task list being selectively provided in the release task list based on the respective values of the selection criteria;
        defining a current task list, each task of the current task list being provided in the running task list and in the release task list; and
        displaying the current task list on the graphical user interface.

16. The device according to claim 15, further comprising a monitoring device that dynamically monitors the selection criteria.

17. The device according to claim 15, further comprising a release device that controls task release.

18. The device according to claim 15, wherein the display is provided as a touch screen display.

19. The device according to claim 15, wherein display of the current task is activated by an individual switching element.

20. The device according to claim 15, wherein the selection criteria comprise at least one of a user login, a date/time, dependencies of tasks in relation to each other, software settings, and software error messages.

* * * * *